United States Patent [19]

Hussmann

[11] 4,138,990
[45] Feb. 13, 1979

[54] FIBROUS WALL MATERIAL FOR CELL STRUCTURES OF SOLAR ENERGY COLLECTORS

[75] Inventor: Eckart Hussmann, Stadecken, Fed. Rep. of Germany

[73] Assignee: JENAer Glaswerk Schott & Gen., Mainz, Fed. Rep. of Germany

[21] Appl. No.: 778,948

[22] Filed: Mar. 18, 1977

[51] Int. Cl.² .............................................. F24J 3/02
[52] U.S. Cl. ...................................... 126/270; 126/271
[58] Field of Search ................ 126/270, 271; 237/1 A

[56] References Cited

U.S. PATENT DOCUMENTS

| | | | |
|---|---|---|---|
| 2,998,005 | 8/1961 | Johnston | 126/270 |
| 4,015,582 | 4/1977 | Liu et al. | 126/270 |
| 4,018,211 | 4/1977 | Barr | 126/271 |
| 4,019,496 | 4/1977 | Cummings | 126/271 |
| 4,030,477 | 6/1977 | Smith | 126/271 |
| 4,054,124 | 10/1977 | Knoos | 126/270 |

*Primary Examiner*—Kenneth W. Sprague
*Attorney, Agent, or Firm*—Schwartz & Weinrieb

[57] ABSTRACT

Fibrous wall materials that are substantially transparent to solar radiation and substantially impervious to long-wave radiation wherein the fibers are arranged in a parallel relationship are disclosed as being useful to form cell structures, in the form of a honeycomb. Heat losses from such solar energy collectors are substantially minimized.

17 Claims, 5 Drawing Figures

FIBROUS WALL MATERIAL FOR CELL STRUCTURES OF SOLAR ENERGY COLLECTORS

BACKGROUND OF THE INVENTION

The present invention relates to a fibrous wall material for cell structures useful in solar energy collectors and more particularly to solar energy collectors having fibrous walls that are substantially transparent to solar radiation and substantially impervious to long-wave radiation.

Solar energy collectors for converting the energy of solar radiation into heat as compared to solar cells, which utilize photoelectric effects, consist of a solar radiation absorber to absorb the radiation which is absorbed as completely as possible, and a suitable arrangement whereby heat is conducted from the absorber to the heat storage unit or directly to the device which utilizes the heat. The heat is generally carried away by a flowing medium (gas or liquid).

The absorber which is heated by the solar radiation, not only gives off its heat to the transporting medium, but also loses heat to the surroundings. Such undesired losses occur with both concentrating collectors and flat collectors.

With flat collectors, the side which is farthest from the incident solar radiation can be easily protected against heat losses. For example, conventional insulating materials, such as glass and rock wool or foam plastic materials, having a suitable thickness, provide good heat insulation at a low cost. It is more difficult to protect that side of the absorber which is exposed to the solar radiation against heat losses. Heat-insulating means which are arranged on this side of the absorber, must, in fact, satisfy the condition that the radiation is able to pass through the heat-insulating arrangements as far as possible, unhindered. Thus, the side of the absorber receiving the solar radiation should be substantially transparent for solar radiation.

Heat losses are caused by heat conduction, convection and radiation exchange. Steps which are taken for suppressing these heat losses frequently are only concerned with one of said forms of heat transfer, and sometimes, more than one of these forms simultaneously.

Heat losses of the solar collectors due to radiation exchange can be suppressed by various methods. Frequently, selectively reflecting layers or coatings are frequently used as absorbers. These layers absorb the solar radiation sufficiently well, but, on the other hand, only emit long-wave infrared to an insignificant degree. Coatings on transparent covering sheets or panes, which are transparent for the solar radiation, but are able to reflect long-wave infrared radiation, act in a similar manner. For example, if such a layer or coating is on the covering pane, on the side facing the absorber, the radiation emitted by the absorber is reflected on the layer and is again absorbed by it. Single or multiple covering panes, which are transparent for solar radiation, but absorb long-wave infrared, are not quite as effective as the measures which have been described above. If an intermediate space is subdivided by an additional pane, the heat transfer in this intermediate space is approximately halved due to radiation exchange.

Heat losses due to heat conduction and convection are closely related to one another with regard to solar energy collectors. The side of the absorber which faces the solar radiation is usually bounded by air. This layer of air conducts heat to the surroundings. It is not sufficient to make this gas layer so thick that the heat losses due to conduction become negligibly small. The convection, which likewise quickly increases, as the thickness of the gas layer increases, leads to the sum of the heat transfer fractions of conduction and convection being almost independent of the gas layer thickness, once a certain thickness is exceeded.

Thus, for example, with flat collectors having several covering panes which are transparent for solar radiaiton, the distance between the absorber and the pane disposed thereabove, or between two panes, and having a thickness of about 15 mm, has no influence on the heat-insulating properties of the arrangement. Any increase in the thickness of the gas layers results in an increase in convection.

One method frequently used for suppressing heat conduction and convection is to enclose the absorber in a vessel which permits the solar radiation to pass through to the absorber and is capable of being evacuated. Below a certain pressure, the convection is reliably suppressed. If the pressure is still further reduced, a point is then reached wherein a further decrease in the pressure reduces the heat conduction. Vessels which are capable of being evacuated must, however, be able to withstand the atmospheric pressure, and consequently this can only be achieved at great expense with flat collectors.

All methods so far known have been used in the widest possible range of application, both in connection with concentrating collectors and flat collectors.

Concentrating collectors with selectively reflecting absorber layers, selectively transmitting layers on the covering panes, or also both, are for example known. The enclosing vessels are often evacuated to a greater or lesser degree.

With regard to flat collectors, many arrangement with selectively reflecting absorber layers under single or multiple sheet or pane coverings have been tested.

Inherent in all of these combinations are disadvantages which cannot, in principle, be overcome by the measures which have been set forth herein.

Thus, at least one transparent covering is already required for keeping rain and dirt away from the absorber. Each additional covering, although desirable for heat insulation purposes, does however increase the absorption and reflection losses of the solar radiation in its passage through the covering to the absorber.

Selectively reflecting layers are expensive and usually present an absorption coefficient which is far removed from the optimum. Moreover, at relatively high temperatures, these layers are often unstable.

In order to avoid or minimize the aforementioned disadvantages, it has been proposed in the prior art to provide honeycomb-like structures between the absorber and the transparent cover sheets. If the shape and size and also the wall material are suitable chosen, then both the radiation exchange and the convection are reduced or almost completely suppressed.

The honeycomb walls generally stand perpendicular on the solar radiation absorber. HOTTEL[1] previously showed that the radiation exchange between bottom and top of such honeycombs or cells is dependent upon the form or shape thereof and on the ratio between average diameter D and the height H of the cell. For cells having walls which absorb long-wave infrared, the radiation exchange — as compared with unhindered exchange — is reduced by a factor F.

| F | Approximately the followings values apply: | | | | | |
|---|---|---|---|---|---|---|
| | = | 0.52 | 0.36 | 0.27 | 0.22 | 0.19 | 0.10 |
| H/D | = | 1 | 2 | 3 | 4 | 5 | 10 |

[1]HOTTELL, Mech.Eng. 52 (1930) 7, pages 699–704. HOTTELL, Am.Soc.Mech.Eng. Paper IS-55-6, Vol. 55, (1933) pages 39–49.

i.e., a cell structure of which the mean cell diameter amounts to only a tenth of the cell height, suppresses the heat transmission due to radiation by the factor 10, pre-supposing that the material of the cell wall absorbs long-wave infrared.

If the mean diameter of a single honeycomb is chosen small enough, then the convection is also suppressed. Depending on temperature difference and honeycomb height, it is possible to find a diameter below which the convection is completely suppressed.[2] For a temperature difference of 50° C. between bottom and top of the honeycomb, it was possible to show that, below a cell diameter of 1 cm., the convection was completely suppressed.[3]

[2]TABOR, Solar Energy, Vol. 11, pp. 549,552, Pergamon Press, 1969.
[3]HOLLANDS, Solar Energy, Vol. 9, No. 3, 1965, pp. 159–164.

In the foregoing, only the properties of such cell structures have been described, which properties are of importance for the heat-insulating behavior thereof. In addition to having the properties as described, the honeycombs must, above all, allow the solar radiation to reach the absorber. The material of the cell wall must therefore be transparent or highly reflecting for solar radiation. In both cases, the solar radiation is able to reach the base of the cell, said base being the absorber. If the collector is caused to follow the position of the sun, then it is also possible to manage with thin honeycomb wall materials which are impervious to solar radiation. The honeycomb walls then only have to stand parallel to the incident radiation.

There is another condition which has to be set for the cell walls. They are to be as thin as possible, so that the heat conduction in the cell walls is small and does not make a considerable contribution to the heat losses of the collector due to conduction in the material of the cell wall.

For the first time, cell structures have been used by Russian scientists for solar energy collectors.[4] They used specially treated paper for the manufacture of the honeycomb structures. A new impetus resulted from the use of honeycomb structures by FRANCIA.[5] He used bunched glass tubes for producing high temperatures. Foils of synthetic plastics likewise initially seemed to be a very suitable material for the honeycomb walls and experiments have also been carried out with these. PERROT et al[6] have experimented with honeycombs of synthetic plastic foils. The results did not come up to expectations, since thin foils of synthetic plastics are partially transparent for the long-wave infrared radiation. BUCHBERG et al[7] used paper as the wall material, said paper having been vapor-coated with aluminum, so that the solar radiation was reflected down to the absorber. The surface of the aluminum was coated with thick lacquer coatings (transparent to solar radiation), the purpose of these coatings being to provide for the long-wave infrared being absorbed in them.

[4]V. B. VEINBERG, Optics in Equipment for the Utilization of Solar Energy, State Publishing House of Defense Ministry, Moscow (1959(, (Translated by U.S. Dept. of Army Intelligence, Translation No. 44787, or USAEC Translation AEC-tr-4471).
[5]G. FRANCIA, Paper E/Conf. 35/5/71. U.N. Conf. on New Sources of Energy, Rome (1961).
[6]PERROT, Solar Energy, g (1967) Vol. 11, no. 1, pp. 34–40.
[7]BUCHBERG, Solar Energy, Vol. 13, pp. 193–221, Pergamon Press, 1971.

If the prior experiments with solar energy collectors having honeycomb structures for suppressing the heat losses are summarized, the conclusion is reached that it would have been possible to construct very good collectors in accordance with this principle, if only suitable materials were available for the honeycomb structures.

The satisfactory materials are those which are transparent for solar radiation. If such wall materials have an optically good surface, i.e., if they only disperse the radiation to a very slight degree, and if the material has low absorption power, then a very high percentage reaches the bottom of the cells, that is to say, reaches the absorber. Wall materials which are not transparent for solar radiation are basically less suitable, since there are no simple coatings which reflect solar radiation free from heat loss. A portion of the solar radiation accordingly does not reach the absorber.

It is just as difficult and unsatisfactory as regards the power of absorption for long-wave infrared, which is necessary so that the radiation exchange is reduced.

If thin foils of plastic materials are used, then a considerable proportion of the long-wave infrared radiation is allowed to pass through. It would be possible to use thicker foils, in order to increase the absorption. It is only a slight improvement which can be obtained in this way because of the typical band structure of the infrared transmission spectra of organic polymers. In spectral regions of high transmissions, it is necessary to have foils of such great thickness in order to noticeably restrict the transmission actually on the said foils, and the cost of the foil would then be an obstacle.

For example, a Hostaphan foil with a thickness of 75 $\mu$m still allows the passage of about 20% of the radiation of a black body of 350° C. Copolymers having a composition which has been selected so that spectral regions of great transmissivity of the one polymer are covered by the absorption bands of the other polymer are of some assistance. Lacquered or lined foils are likewise possible. An additional disadvantage is that the plastic materials have to be exceptionally stable to various radiation effects. As more different plastic materials contributing to the fabrication of the foil, the more difficult it is to satisfy the stability conditions in addition to the properties which have already been discussed hereinbefore. A need therefore exists to eliminate or minimize the aforementioned difficulties and disadvantages.

OBJECTS OF THE INVENTION

It is therefore a significant object of the present invention to provide a fibrous wall material for cell structures of solar energy collectors, comprising an arrangement of fibers, said fibers being substantially transparent to solar radiation and substantially impervious for long-wave infrared radiation, the fibers being arranged in layers in a parallel relationship.

Another significant object of this invention is the provision of a solar energy collecting unit wherein heat losses are substantially minimized.

A still further object of the present invention is the provision of a solar energy collecting unit that can be simply and economically manufactured.

SUMMARY OF THE INVENTION

The foregoing and other objectives are achieved in accordance with the present invention through the provision of fibrous wall structures useful between an absorber and a transparent cover sheet, if used, in a solar collecting unit. The material of the fibrous wall comprises an arrangement of fibers wherein said fibers are substantially transparent to solar radiation and substantially impervious to long-wave infrared radiation. The fibers are further arranged in layers in a parallel relationship. The invention also relates to the cells or honeycombs per se that are made with said fibrous wall materials.

BRIEF DESCRIPTION OF THE DRAWINGS

Various other objects, features, and attendant advantages of the present invention will be more fully appreciated as the same becomes better understood from the following detailed description when considered in connection with the accompanying drawings, and wherein.

DETAILED DESCRIPTION OF THE INVENTION

The fibers used in the practice of this invention may comprise any fibers having the aforementioned properties. Particularly suitable fibers include glass and mineral fibers. Suitable glass fibers include quartz glass, E-glass, and glass compositions consisting of the following: (A) 12% boron oxide, 80% silica, 5% alkali metal oxide, 3% alumina; and (b) 50% silica, 20% alumina, 9% boron oxide, and 13% alkaline earth oxide. Suitable mineral fibers include conventional fibers such as rockwool.

Figure 1A:
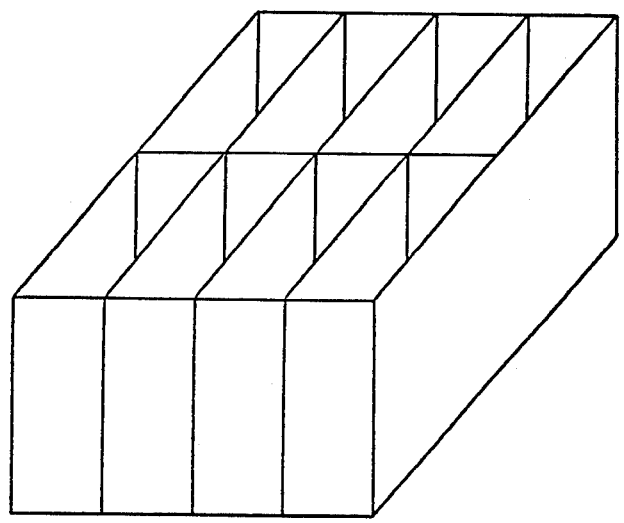
FIG. 1a illustrates a wall structure in the form of a honeycomb having a rectangular cross-section.
Figure 1B:
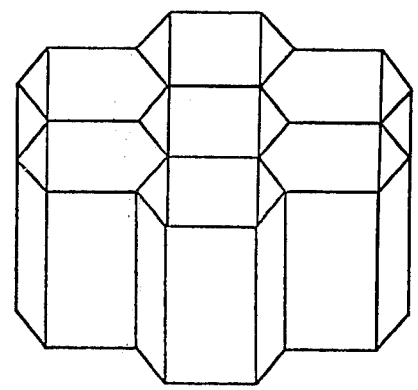
FIG. 1b illustrates a wall structure in the form of a honeycomb having a hexagonal cross-section.
Figure 2:
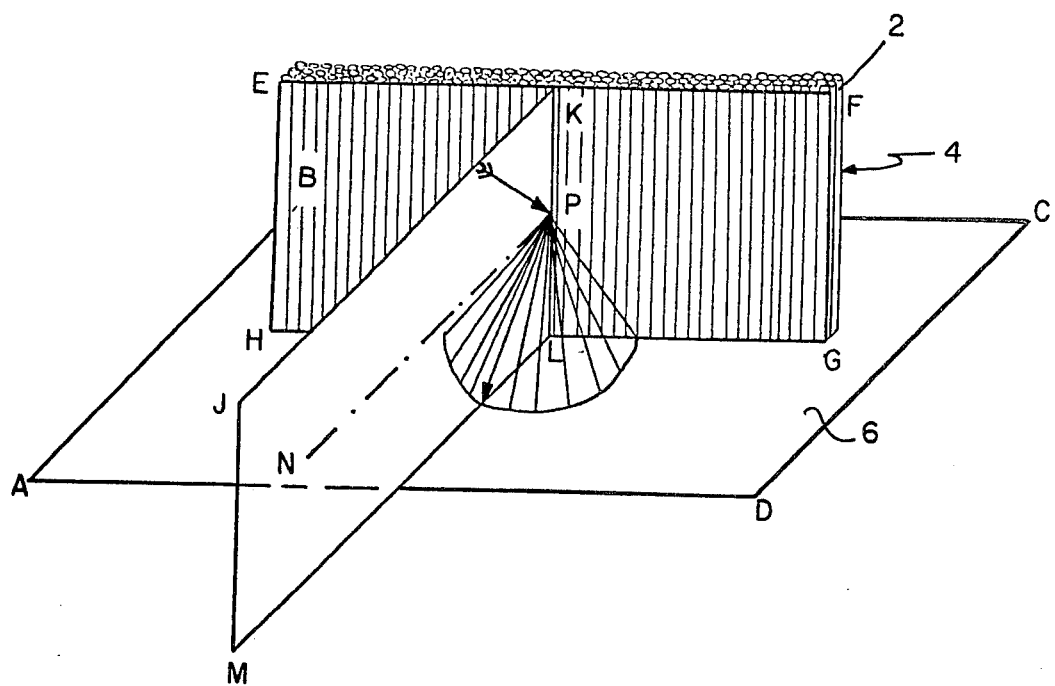
FIG. 2 is a perspective view of a solar energy collector of the present invention.

The fibers may be arranged upon a supporting foil, preferably a foil that is transparent to solar radiation. At least one layer of fibers may be arranged in a parallel relationship with the fibers being bound to one another by means of a plastic bonding material that is also transparent to solar radiation. The fibers may preferably be wound or coiled over a frame to provide a closed covering fiber wall, as illustrated in FIG. 2. When glass fibers are used, they should preferably be arranged, one above the other, so that the solar radiation has to penetrate a fiber thickness of about 10 to 15 $\mu$m, on the average. A double layer of fibers is sufficient when using fibers having a thickness of 10 $\mu$m. FIG. 2, of the accompanying drawings shows, in perspective, a solar energy collector illustrative of the present invention. Thin glass fibers 2 are arranged parallel and in such a juxtaposition to one another that the fibers, disposed in several layers, form a closed, covering wall 4. If a plane (called "fiber wall plane", points E,F,G,H) common to all the axes of the fibers 2 of the uppermost layer is drawn through the said axes, the axes of the fibers should stand perpendicular to the section line of the fiber wall plane with the absorber plane (line G-H).

The fiber wall plane is generally disposed perpendicular to the absorber plane (points A,B,C,D), although it is possible, as will later be explained, to deviate from this condition. In respect of a ray which lies in an incidence plane (points J,K,L,M) which is, for example, perpendicular to the fiber wall plane, it can be seen that the proportion of the incident radiation which is reflected on the fibers is reflected from the point of incidence P in many different directions; however, the inclination of these different rays relative to the absorber plane remains the same for each ray. Consequently, a radiation reflected several times at different planes of the fiber wall safely reaches the base of the honeycomb, i.e., the absorber 6. It can also be shown that the proportion of the radiation which passes through the fibers always maintains its inclination or slope relative to the absorber plane. If one departs from the condition that the plane of the fiber wall is no longer perpendicular to the absorber plane, then also in this case, most of the incident radiation will reach the bottom of the honeycomb, provided the angle of incidence between radiation and absorber plane remains smaller than the angle between fiber wall plane and absorber plane (what is meant here is the angle which is smaller than 90°). It is understood that the incident angle is, as usual, the angle between the normal to the absorber plane and the incident beam or ray.

One possibility consists in arranging one or more layers of fibers in parallel, on a supporting foil or frame, and adhering them to the foil by means of a suitable binder. Neither the refractive index of the supporting foil or frame, nor the refractive index of the adhesive, must be the same as the refractive index of the fibers. The supporting foil only has to be transparent for the solar radiation, and this condition also applies with respect to the adhesive. Suitable polymeric binders include, for example, polymethyl methacrylate.

According to another embodiment of the invention, a cellular, e.g., honeycomb structure useful in a solar energy collector is provided which has been formed from the fibrous wall materials defined hereinbefore. According to this embodiment of the invention, the fibrous wall materials are in the form of a honeycomb wherein the cells thereof can have any one of a number of cross-sections, e.g., rectangular, hexagonal, etc. In the formation of these cell structures it is not necessary to use a supporting foil although the same can be used if desired. When several layers of fibers are arranged in a parallel relationship, said fibers being bonded to one another by means of a plastic material, there is usually no need for a supporting foil. Although the synthetic plastic bonding materials used to bond the fibers together must be transparent for solar radiation, it is not necessary for the refractive indices of the fibers and the synthetic plastic bonding materials to be the same.

Another embodiment of the invention consists of fibers which are wound or coiled over a frame. Suitable frames used for this purpose consist of stamped sheet metal, tensioned wires or other materials forming a stable frame wherein glass fibers are wound tightly thereover whereby a closed fiber wall is formed. Honeycombs are then fabricated from these fiber walls. This last mentioned embodiment is particularly suitable for honeycomb structures or cells which are to be used at temperatures higher than 200° C. Most of the transparent plastics materials are only to be used up to about 200° C.

The fibers which are described herein do not in all cases have to be made of glass provided they are transparent for the solar radiation and have a strongly absorbing action in respect to long-wave infrared radiation. Mineral fibers are likewise suitable and suitable mineral fibers include rockwool.

If glass fibers are used, they should preferably be arranged one above the other so that the solar radiation has, on the average, to penetrate a fiber thickness of at least 10 to 15 $\mu$m. a double layer of fibers is sufficient when using fibers with a thickness of 10 $\mu$m.

Glass fibers have the economic advantage that they are extremely efficient. Quartz glass fibers are especially suitable for being used at high temperature.

According to another embodiment of the invention, a solar energy collector is provided comprising a solar radiation absorber and one or more cell structures as defined in the preceding paragraph. Generally the axes of the fibers are perpendicular to the section line between the fiber wall plane and the absorber plane.

The invention will be better understood by making reference to the following examples which illustrate preferred embodiments of the invention:

EXAMPLE 1

Wall Material of Fibers Bonded to One Another

Glass fibers (E-glass) with a thickness of 10 $\mu$m are wound tightly and uniformly over a rod-type drum, so that two to four layers of fibers assume a parallel position one above the other. These fibers are bonded to one another with polymethyl methacrylate (PMMA), by immersing the drum briefly in dissolved PMMA, or by PMMA being applied to the fibers. Chloroform is recommended as solvent. After the curing of the PMMA, the fiber foil is cut off from the drum in a suitable width.

EXAMPLE 2

Wall Material of Fibers Wound over a Frame

Figure 3:
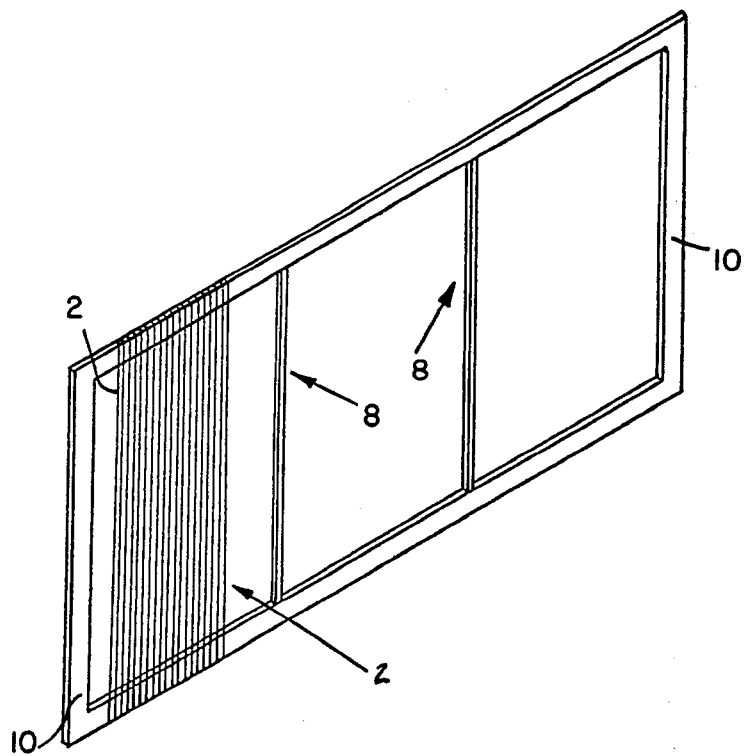
FIG. 3 is a perspective view of another embodiment of the present invention wherein supports are used at suitable intervals to support the frame over which the fibrous wall material is applied.
Figure 4:
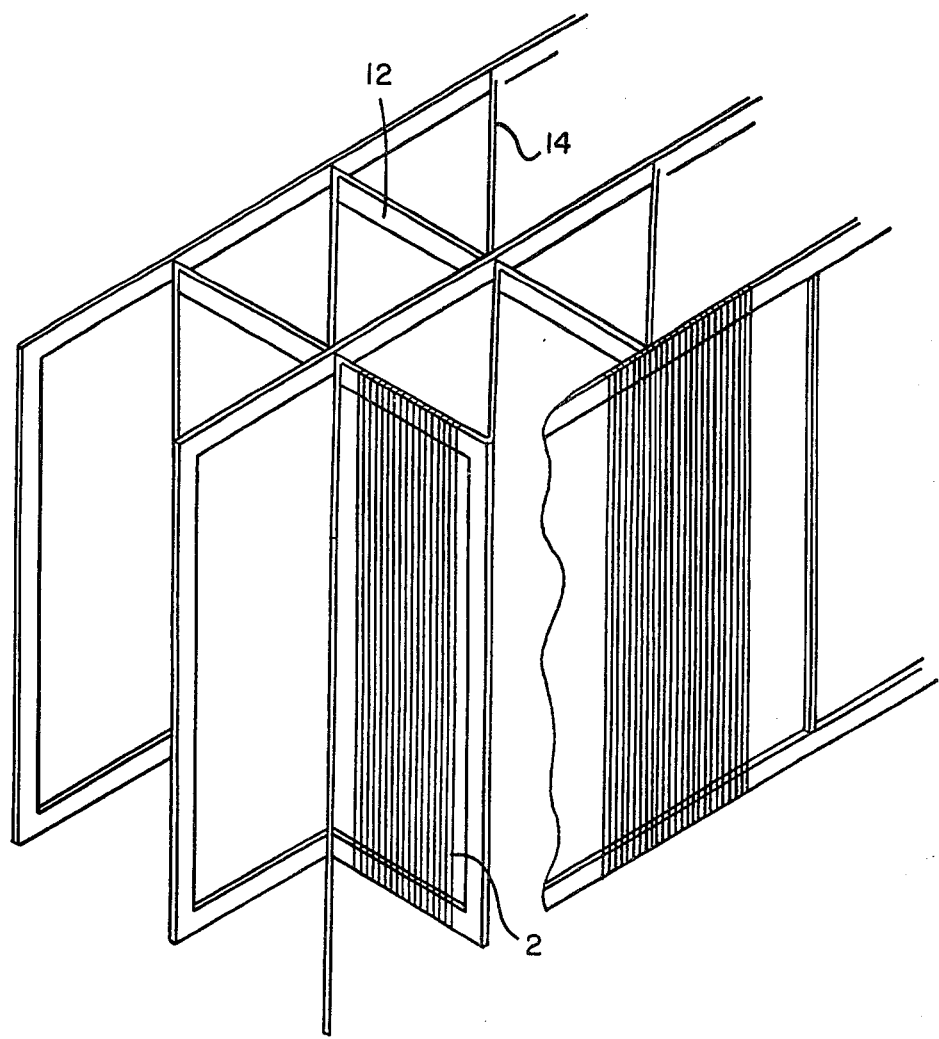
FIG. 4 is a perspective view of still another embodiment of the present invention illustrating the use of alternately angular and straight frames.

Glass fibers (E-glass) having a thickness of 10 $\mu$m are wound sufficiently tight, over stamped-out sheet metal frames resulting in two to four layers of fibers being arranged parallel one above the other. The sheet metal frame 10 is made of thin (0.1 to 0.3 mm) sheet metal. If necessary, supports 8 can be included in the frame at suitable intervals as shown in perspective in FIG. 3 of the accompanying drawings. A great improvement in the stability of the frame and simultaneously a suitable honeycomb cross-section is obtained by the frame around which the fibers 2 are wound being bent over at regular intervals. FIG. 4 of the accompanying drawings shows in perspective a honeycomb structure which is composed of alternately angular and straight frames, for example, 12 and 14.

It is noted that the frames that are used in the present invention to form the fibrous walls, can be any hard, solid material, e.g., metal, plastic, wood and the like.

What is claimed is:

1. A fibrous wall material useful in a cell structure of a solar energy collector, said fibrous wall material comprising a supporting frame and an arrangement of fibers wherein said fibers are parallel to each other and substantially transparent to solar radiation and substantially impervious to long-wave infrared radiation, said fibers being arranged in layers in a parallel relationship, said fibers being wound or coiled over said supporting frame thereby providing a closed covering filler wall.

2. The fibrous wall material of claim 1 wherein said fibers comprise glass.

3. The fibrous wall material of claim 2, wherein said fibers comprise quartz glass.

4. The fibrous wall material of claim 1, wherein said supporting frame is transparent to solar radiation.

5. The fibrous wall material of claim 4 wherein at least one layer of said fibers arranged in parallel relationship has its fibers bound to one another by a plastic material transparent to solar radiation.

6. The fibrous wall material of claim 1, wherein said fibers comprise mineral fibers.

7. The fibrous wall material of claim 6 wherein said supporting frame is transparent to solar radiation.

8. The fibrous wall material of claim 7 wherein at least one layer of said fibers arranged in parallel relationship has its fibers bound to one another by a plastic material transparent to solar radiation.

9. A cell structure useful in a solar energy collector comprising a plurality of fibrous wall materials as set forth in claim 1.

10. The cell structure of claim 9 wherein said wall materials are in the form of a honeycomb.

11. The cell structure of claim 10 wherein said honeycomb has a hexagonal cross-section.

12. The cell structure of claim 10 wherein said honeycomb has a rectangular cross-section.

13. In a solar energy collecting unit comprising a solar radiation absorber and at least one cell structure according to claim 9.

14. The solar energy collecting unit of claim 13, wherein said cell structure is in the form of a honeycomb.

15. The solar energy collecting unit of claim 14 wherein said honeycomb has a rectangular cross-section.

16. The solar energy collecting unit of claim 15 wherein the axes of fibers are perpendicular to a section line between the fiber wall plane and the absorber plane.

17. The solar energy collecting unit of claim 16 wherein said fibers are E-glass and have a thickness of 10 $\mu$m.

* * * * *